(12) United States Patent
Sakakibara et al.

(10) Patent No.: US 7,643,935 B2
(45) Date of Patent: Jan. 5, 2010

(54) PARKING ASSIST SYSTEMS, METHODS, AND PROGRAMS

(75) Inventors: Seiji Sakakibara, Okazaki (JP); Tomoki Kubota, Okazaki (JP); Toshihiro Mori, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 414 days.

(21) Appl. No.: 11/433,421

(22) Filed: May 15, 2006

(65) Prior Publication Data

US 2006/0271278 A1  Nov. 30, 2006

(30) Foreign Application Priority Data

May 26, 2005 (JP) ............... 2005-154621

(51) Int. Cl.
  *G01C 21/00* (2006.01)
  *B60Q 1/48* (2006.01)
(52) U.S. Cl. .................. 701/207; 340/932.2
(58) Field of Classification Search ........... 701/207; 340/932.2
See application file for complete search history.

(56) References Cited

U.S. PATENT DOCUMENTS

| 6,515,597 B1 * | 2/2003 | Wada et al. ............ 340/988 |
| 6,654,670 B2 * | 11/2003 | Kakinami et al. ............ 701/1 |
| 7,366,595 B1 * | 4/2008 | Shimizu et al. ............ 701/301 |
| 2005/0043871 A1 * | 2/2005 | Endo et al. ............ 701/36 |
| 2005/0055139 A1 * | 3/2005 | Tanaka et al. ............ 701/1 |
| 2005/0174429 A1 * | 8/2005 | Yanai ............ 348/148 |

FOREIGN PATENT DOCUMENTS

| JP | A 2000-280823 | 10/2000 |
| JP | A 2001-218197 | 8/2001 |

\* cited by examiner

*Primary Examiner*—Mark Hellner
*Assistant Examiner*—Helal A Algahaim
(74) *Attorney, Agent, or Firm*—Oliff & Berridge, PLC

(57) ABSTRACT

Parking assist systems, methods and programs identify a position of a vehicle and obtain image data of an area around the vehicle from a camera on the vehicle. The systems, methods, and programs associate the obtained image data with a position of the vehicle where the image data was obtained and store the obtained image data and the associated position of the vehicle as past image data in a memory. The systems, methods, and programs determine whether the vehicle has at least entered a target parking area and display, based on the determination, an image on a display unit, the displayed image based on the past image data and image data taken at a current position of the vehicle.

14 Claims, 15 Drawing Sheets

PARKING ASSIST SYSTEMS, METHODS, AND PROGRAMS

INCORPORATION BY REFERENCE

The disclosure of Japanese Patent Application No. 2005-154621 filed on May 26, 2005 including the specification, drawings and abstract is incorporated herein by reference in its entirety.

BACKGROUND

1. Related Technical Fields

Related technical fields include parking assist systems, methods, and programs.

2. Related Art

Conventional parking assist devices for vehicles obtain image data from a camera mounted on the rear of the vehicle and output the image on a display provided in the vehicle (see, e.g., Japanese Patent Application Publication No. JP-A-2000-280823). According to such conventional devices, the camera is mounted on the substantially central part at the rear end of the vehicle. The camera is fixed such that the optical axis of the camera is oriented downward.

Conventional parking assist devices also accumulate image data obtained from a camera and display a composite image using past image data (see, e.g., Japanese Patent Application Publication No. JP-A-2001-218197). According to such devices, based on the accumulated image data, it is possible to simulate a view of an area, which is outside the current visible area of the camera, on the display. Therefore a driver may confirm a position of the vehicle relative to a target parking area.

SUMMARY

According to the above conventional devices, either the visible range of the camera is limited to an area extending only several meters from the rear end of the vehicle or the device must store a very large amount of past image data. Specifically, according to one type of device, it is only possible to view the road surface for several meters behind the vehicle on the display. According to the other type of device, the device needs to accumulate respective pieces of image data obtained from the camera in a memory. For example, the camera generates image data having information amount of about several hundreds kilobytes to one mega byte at sampling intervals of several tens of a millisecond. Therefore, a very large amount of image data taken by the camera must be stored. This amount of data causes a large load on the CPU, and requires a large memory capacity. Further, even if a mass storage memory is provided in the device to accumulate the large number of pieces of image data, it then becomes difficult to search and extract the image data that is required during a particular movement of the vehicle.

Accordingly, it is beneficial to provide parking assist systems, methods, and programs that may display an image using past image data, and may also reduce the processing load.

Various exemplary implementations of the broad principles described herein provide systems, methods, and programs that may identify a position of a vehicle and may obtain image data of an area around the vehicle from a camera on the vehicle. The systems, methods, and programs may associate the obtained image data with a position of the vehicle where the image data was obtained and may store the obtained image data and the associated position of the vehicle as past image data in a memory. The systems, methods, and programs may determine whether the vehicle has at least entered a target parking area and may display, based on the determination, an image on a display unit, the displayed image based on the past image data and image data taken at a current position of the vehicle.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
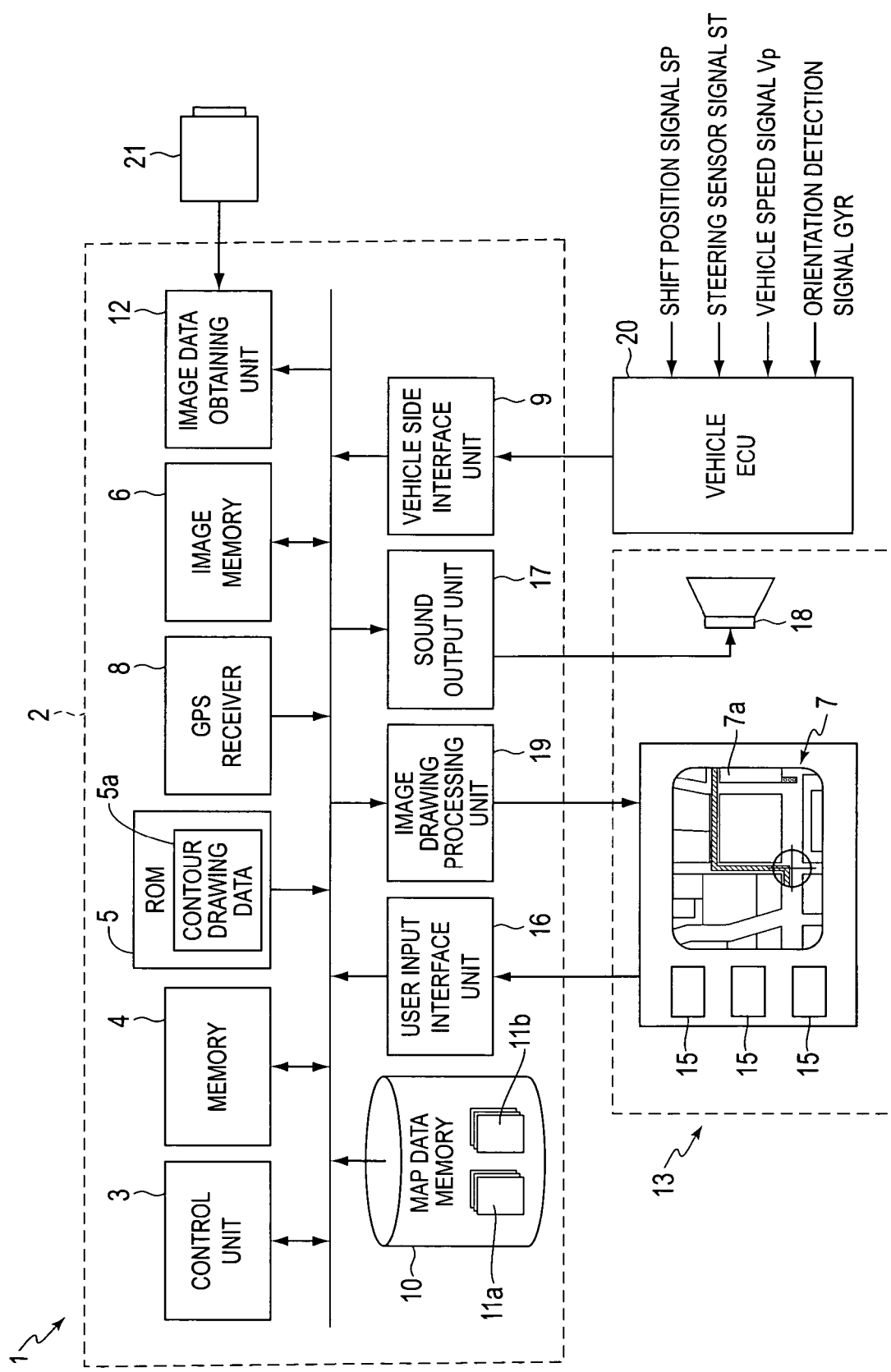
FIG. 1 shows an exemplary navigation apparatus.

Hereinafter, for ease of explanation, exemplary parking assist systems, methods, and programs will be described as associated with a navigation apparatus mounted in a vehicle. However, it should be appreciated that the systems, methods, and programs need not be associated with a navigation device and thus need not be limited by the structure or operation of a navigation device. FIG. 1 is a block diagram illustrating a structure of an exemplary navigation apparatus 1 with which the exemplary parking assist systems, methods, and programs may be associated.

As shown in FIG. 1, the navigation apparatus 1 may include a controller 2. The controller 2 may be part of a parking assist system and may include, for example, a control unit 3 for carrying out main control, a memory 4, a ROM 5, and/or an image memory 6. The control unit 3 may include, for example, a CPU (not shown) and may carry out various processes, for example, in accordance with various programs, such as a route guidance program and/or a parking guidance program stored in the ROM 5. The control unit 3 may, for example, identify positions, make various determinations, control output, a calculation distances, and determine distances. The memory 4 may be, for example, a RAM for storing various variables used during parking assistance.

Further, the ROM 5 may store contour drawing data 5*a*. The contour drawing data 5*a* may be used for outputting the contour of a vehicle C (see, e.g., FIG. 3) to a display 7. The contour drawing data 5*a* may be determined depending on, for example, the vehicle width and/or the length of the vehicle C. In the case where the vehicle C is a small car, the contour of the small car may be displayed, and in the case where the vehicle C is a large car, the contour of the large car may be drawn on the screen.

Further, the controller 2 may include or be attached to a GPS receiver 8 for receiving an electric wave from a GPS satellite. Based on a position detection signal inputted from the GPS receiver 8, the control unit 3 may calculate the absolute position of the vehicle C such as, for example, the longitude, the latitude, and/or the altitude periodically.

The controller 2 may include or be attached to a vehicle side interface unit (vehicle side I/F unit 9). The control unit 3 may input various items of data from, for example, a vehicle ECU (electronic control unit) 20 provided in the vehicle C through the vehicle side I/F unit 9. The vehicle ECU 20 may input traveling information, for example, from various sensors and control circuits provided in the vehicle C. The traveling information may include a shift position signal SP, a steering sensor signal ST, a vehicle speed signal Vp, and/or an orientation detection signal GYR for detecting the movement direction. The shift position signal SP may be output from a control circuit (not shown), e.g., for controlling a transmission, and may indicate the current shift position. The steering sensor signal ST may be output from a steering sensor (not shown), and may output the current steering angle of the vehicle C. The vehicle speed signal Vp may be output from a vehicle speed sensor (not shown), and may indicate the traveling speed of the vehicle C. The orientation detection signal GYR may be output from a gyro sensor provided in the vehicle C, and may indicate the orientation of the vehicle C.

Figure 3:
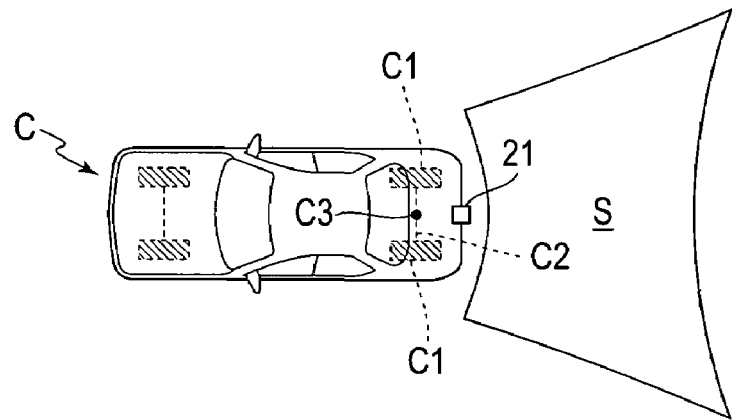
FIG. 3 shows an exemplary visible range of the camera.

The control unit 3 may calculate the relative distance and the relative orientation from a reference position based on, for example, the vehicle speed signal Vp and the orientation detection signal GYR inputted through the vehicle side I/F unit 9, and may generates autonomous navigation data indicating the position of the vehicle. Then, the absolute position of the vehicle C based on the GPS receiver 8 may be corrected using the autonomous navigation data to determine the position of the vehicle. For example, as shown in FIG. 3, the central point C3 of the rear axle C2 of rear wheels C1 may be calculated as the position of the vehicle.

The control unit 3 may store or update the shift position NSW and the current steering angle STR based on the shift position signal SP and the steering sensor signal ST inputted through the vehicle side I/F unit 9 in accordance with, for example, a parking assist program. The shift position NSW is a variable indicating the current shift position of the vehicle C. The current steering angle STR is a variable indicating the current steering angle of the vehicle C.

The controller 2 may have or be attached to a map data memory 10. The map data memory 10 may store route data 11*a* and map drawing data 11*b*. The route data 11*a* may include node data and link data.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein the term "node" refers to a point connecting two links. A node may be, for example, an intersection, an intersection having more than three roads, a curve, and/or a point at which the road type changes.

The control unit 3 may use the route data 11*a* to provide route guidance to a destination. The control unit 3 may carry out the route search and the route guidance in accordance with, for example, the route guidance program stored in the ROM 5. Also, the control unit 3 may collate the calculated position of the vehicle (as described above), the traveling trajectory, and/or the route data 11*a* for determining the position of the vehicle on a suitable road, and correcting the position of the vehicle. The map drawing data 11*b* may be used for displaying a map of a wide area to a narrow area on the display 7. The map drawing data 11*b* may be associated with the route data 11*a*.

The controller 2 may include or be attached to an image data obtaining unit 12. The image data obtaining unit 12 may control a rear monitor camera (hereinafter simply referred to as the "camera") provided in the vehicle C, for example, for sequentially obtaining image data G each time the vehicle C moves by a predetermined distance.

Figure 2:
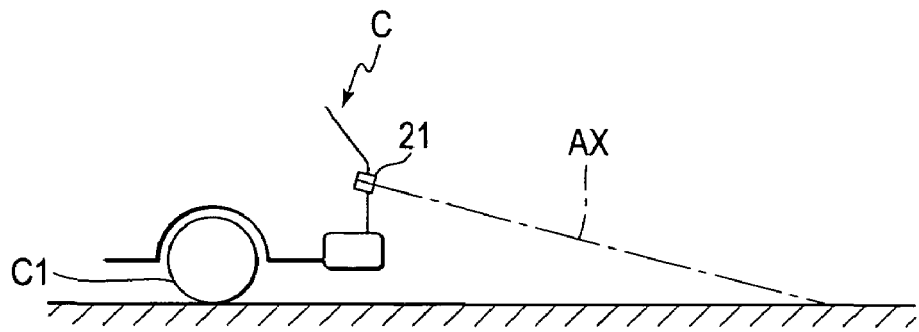
FIG. 2 shows an exemplary position of mounting a camera.

As shown in FIG. 2, the camera 21 may be mounted on a substantially central position, at the rear end of the vehicle C such that the optical axis AX is oriented downward. For example, the camera 21 may be mounted on a back door of the vehicle C. The camera 21 may be a digital camera for taking a color image, and may include an optical mechanism (not shown) including components such as, for example, a wide angle lens, a mirror, and/or a CCD imaging element (not shown). As shown in FIG. 3, for example, the camera 21 may have a rear view field in a range of about 140° on the left and right sides. The camera 21 may have an imaging range S extending over about 3 meters or more behind the vehicle C, including the area at the rear end of the vehicle C.

The image data G generated by the camera 21 may be digital data that has been subjected to analog/digital conversion. When a command for obtaining the image data G is inputted from the control unit 3 to the image data obtaining unit 12, the image data obtaining unit 12 may control the camera 21 to start obtaining the image data G. As described above, the obtained image data may be color image data and may have the information amount of about several hundreds kilobytes to about one mega byte. Further, since the camera 21 may use a wide angle lens, if the image data G is outputted to the display 7 without image processing, a peripheral portion of the image may be distorted, i.e., so called distortion aberration is produced.

Figure 4:
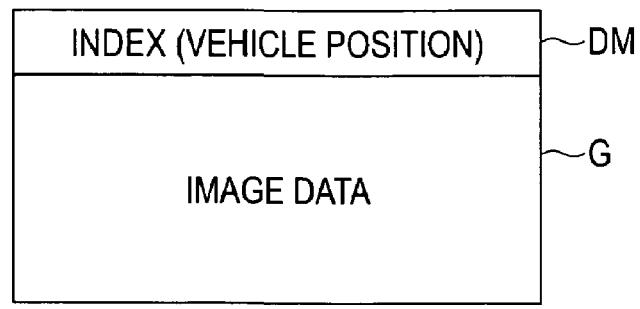
FIG. 4 shows exemplary image data stored in an image memory.

When the control unit 3 obtains the image data G from the image data obtaining unit 12, for example, as schematically shown in FIG. 4, the control unit 3 may attach the position of the vehicle (imaging position) indicating the position where the image data G was taken to the image data G, as an index DM (header) for the image data G, and may store the image data G and the index DM in the image memory 6. That is, the image data memory 6 may not store the whole image data G taken by the camera 21, but may stores the image data G that is taken each time the vehicle C moves a predetermined distance. Further, the attached index DM may be an absolute coordinate or a relative coordinate based on a reference position.

The navigation apparatus 1 may have an output unit 13 including, for example, the display 7 and/or a speaker 18. The display 7 may be used for displaying the image data G and may be a touch panel. When the vehicle C moves forward, under the control of the control unit 3, the map drawing data 11*b* may be outputted, and the map screen 7*a*, for example, as shown in FIG. 1, may be displayed. When the vehicle C moves backward, under the control of the control unit 3, a rear image screen 30 (see, e.g., FIG. 5), which is an image of the area behind the vehicle C, may be displayed. Further, at a predetermined timing, a screen displaying a past image and the current image may be outputted, using the image data G accumulated in the image memory 6 and the image data G taken at the current position.

When a user manipulates the touch panel or a control switch 15 provided near the display 7 for inputting data, a user input interface unit (hereinafter referred to as the "user input I/F unit 16") of the controller 2 may output an input signal in correspondence with the input manipulation to the control unit 3.

The controller 2 may have a sound output unit 17. The sound output unit 17 may access sound data (not shown). Under control of the control unit 3, the sound output unit 17 may output audio voice guidance and/or guidance sounds from the speaker 18 of the navigation apparatus 1.

The controller 2 may have an image drawing processing unit 19. The image drawing processing unit 19 may include, for example, a calculation unit (not shown) for carrying out image processing, and a VRAM (not shown) for temporarily storing output data to be displayed on the display 7. The image drawing processing unit 19 may correct distortion aberration of the image data G, for example, under control of the control unit 3.

Figure 5:
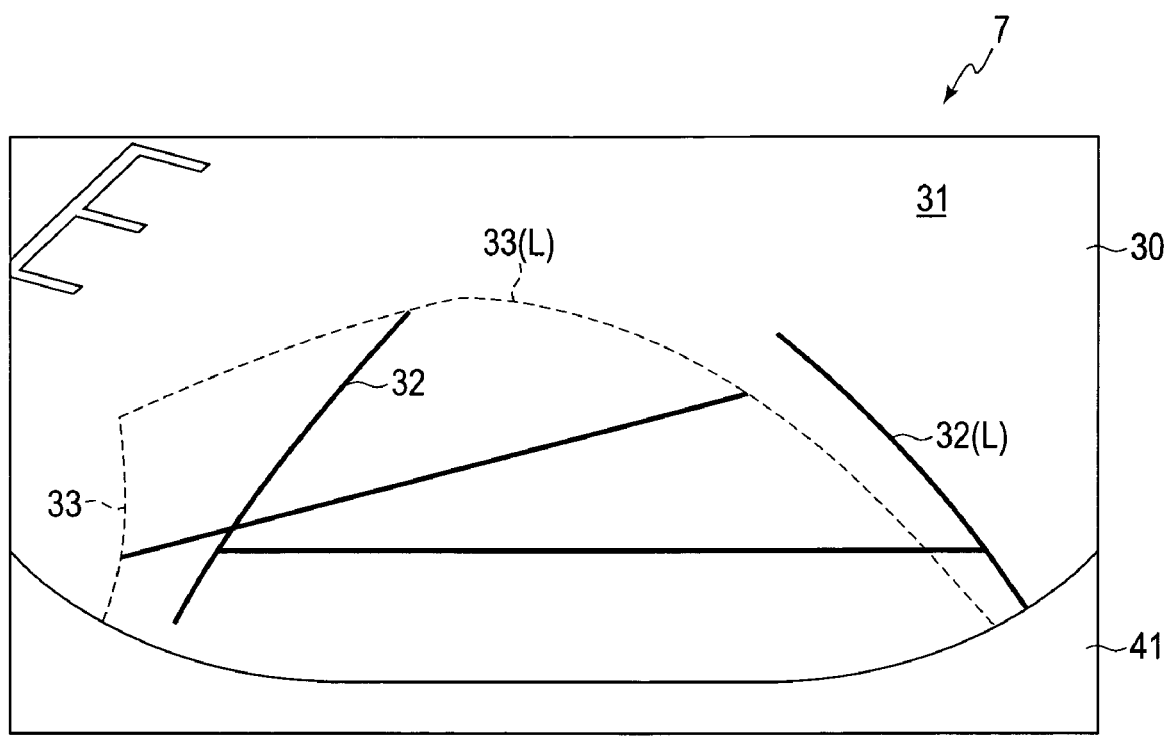
FIG. 5 shows an exemplary rear image screen.

When the vehicle C moves backward, under control of the control unit 3, the image drawing processing unit 19 may output the image data G obtained from the image data obtaining unit 12 to the display 7 and may display the rear image screen 30, for example, as shown in FIG. 5. On the rear image screen 30, a background image 31 taken of an area behind the vehicle C may be displayed. Further, in the background image 31, guide lines L, including vehicle width extension lines 32 denoted by solid lines, and predicted trajectory lines 33 denoted by broken lines, are displayed in an overlapping manner. The vehicle width extension line 32 may be a mark that is an extension of the vehicle width of the vehicle C in the rearward direction. The predicted trajectory line 33 may be a mark indicating a traveling trajectory of the vehicle C moving backward, for example, which may be predicted based on the current steering angle STR and the vehicle width. The predicted trajectory line 33 indicates a predicted trajectory in the range extending over the predetermined distance (e.g., about 2.7 m) from the vehicle C.

Figure 15:
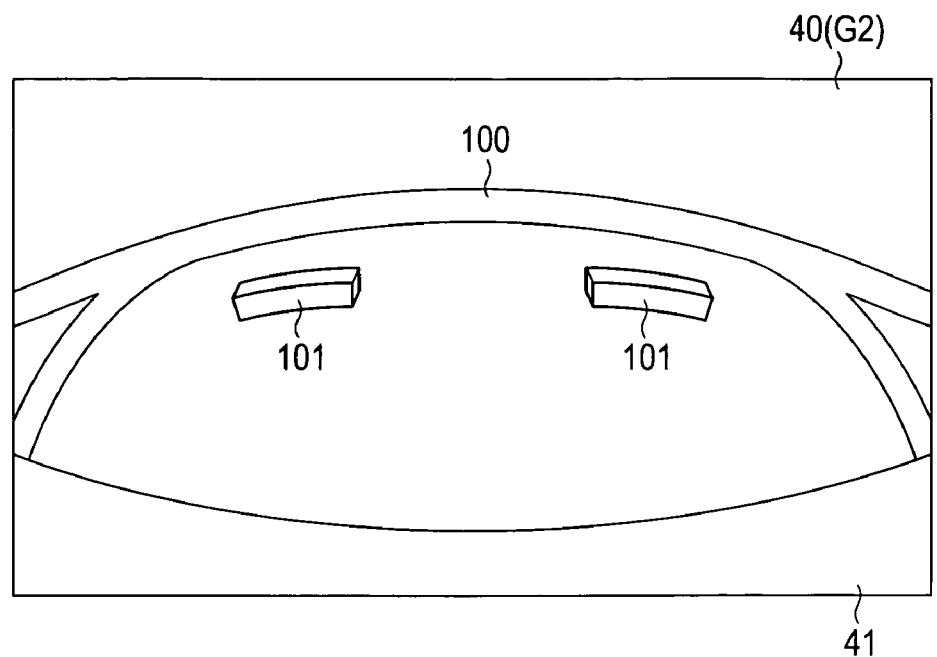
FIG. 15 shows an exemplary screen.
Figure 21:
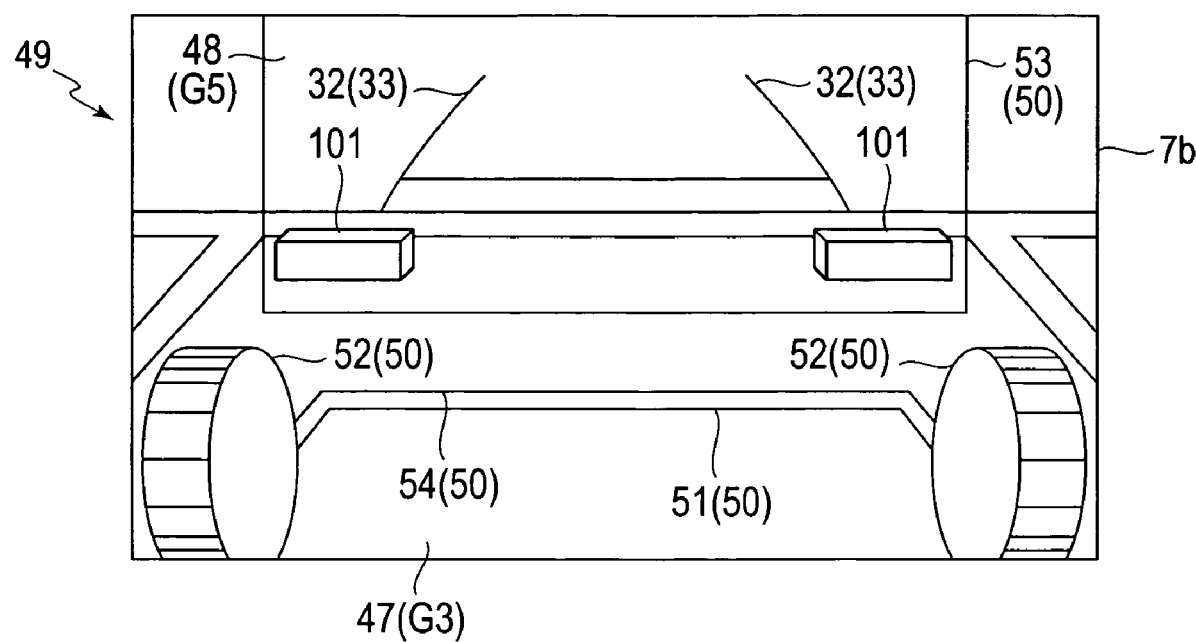
FIG. 21 shows an exemplary composite screen.

The image drawing processing unit 19 may read the required image data G among respective pieces of image data G (hereinafter referred to as the "past image data G2") stored in the image memory 6, and may output a composite screen 49, for example, shown in FIG. 21. Specifically, when an image composition signal outputted from the control unit 3 and the current position of the vehicle are inputted to the image drawing processing unit 19, the past image data G2 may be read from the image memory 6. A coordinate that is away from the position of the vehicle by a predetermined image updating distance Dx may be attached to the past image data G2 as the index DM. In this manner, the image updating distance Dx may be used for determining the timing of reading and combining the past image data G2. For example, the image updating distance Dx may be about 500 mm. At this time, for example, the read past image data G2 is used for outputting an image 40 as shown in FIG. 15. The image 40 includes a rear end image 41 taken from the area at the rear end (e.g., rear bumper) of the vehicle C.

Figure 16:
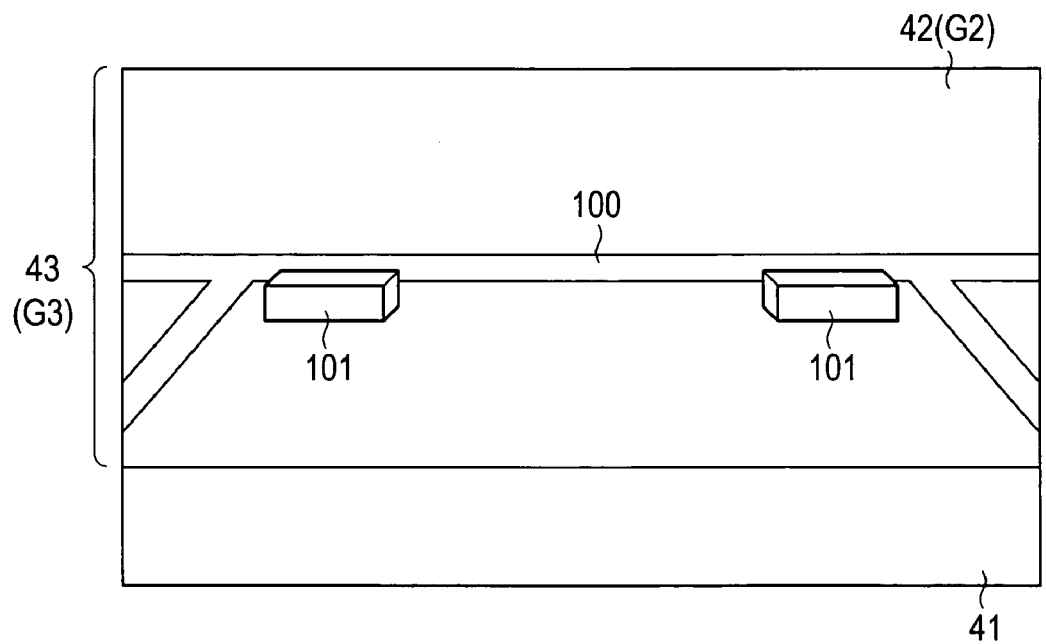
FIG. 16 shows an exemplary screen based on corrected image data.

The image drawing processing unit 19 may corrects distortion aberration of the past image data G2 to form an image 42 as shown in FIG. 16. Further, the image drawing processing unit 19 may extracts an area 43 (first and second areas) other than the rear end image 41 among the corrected past image data G2 to generate past data G3 for composition. At this time, since the mounting position of the camera 21 and the optical axis AX are fixed, the composition past data G3 can be generated by extracting a predetermined data area.

Figure 17:
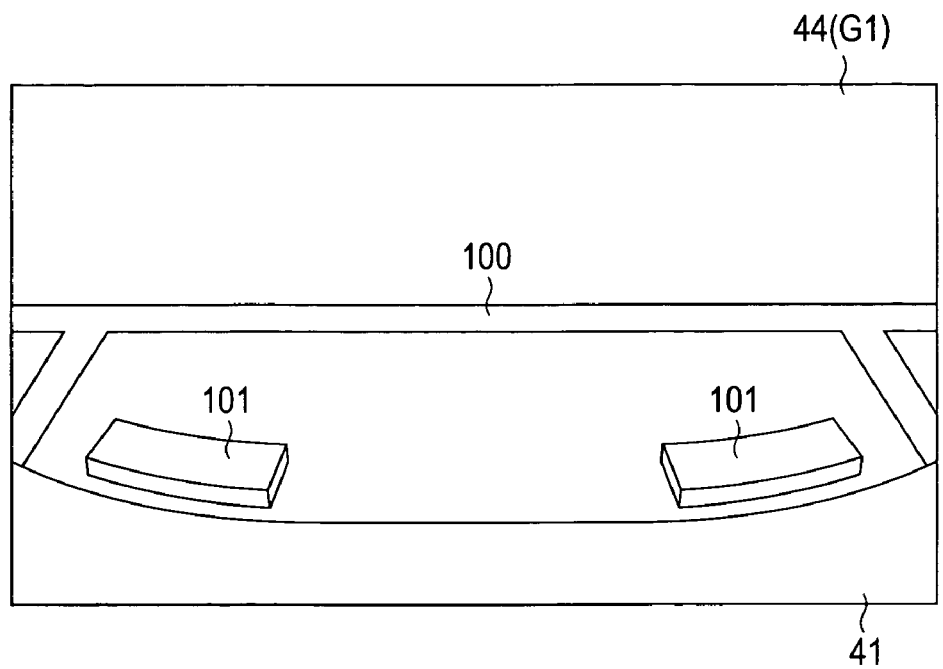
FIG. 17 shows an exemplary screen.
Figure 18:
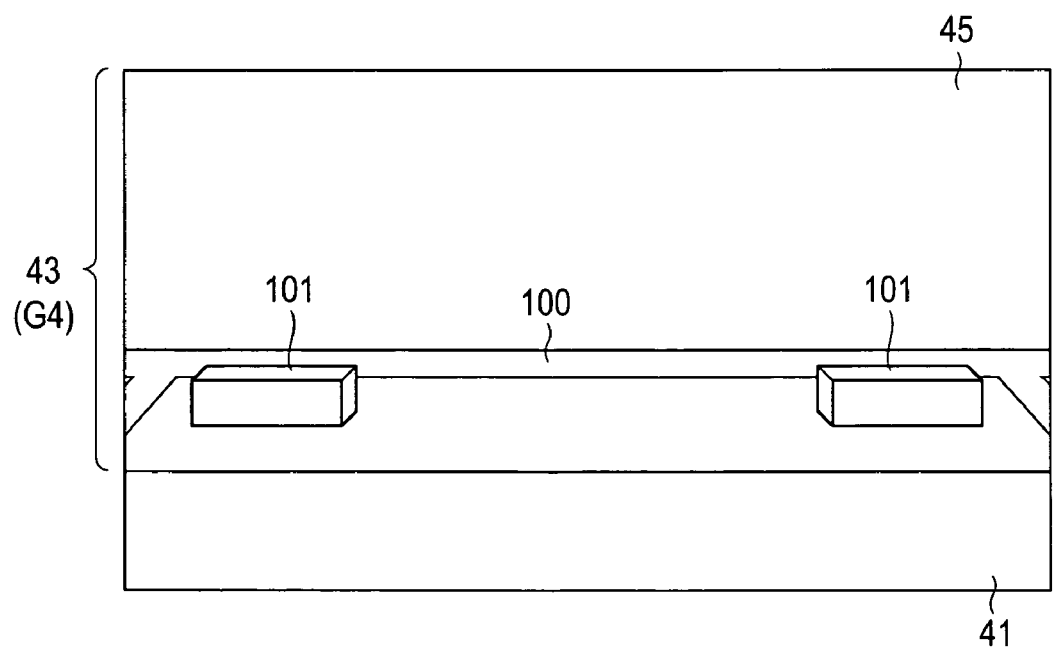
FIG. 18 shows an exemplary screen based on corrected image data.

The image drawing processing unit 19 may obtain the image data G (hereinafter referred to as the "current image data G1") taken at the current position of the vehicle. For example, the current image data G1 may be used for outputting an image 44 as shown in FIG. 17. The image drawing processing unit 19 may correct distortion aberration of the current image data G1. Thus, the current image data G1 may be corrected into an image 45 as shown in FIG. 18. The image 43 other than the rear end image 41 is extracted from the current image data G1 to generate composition current data G4.

Figure 19:
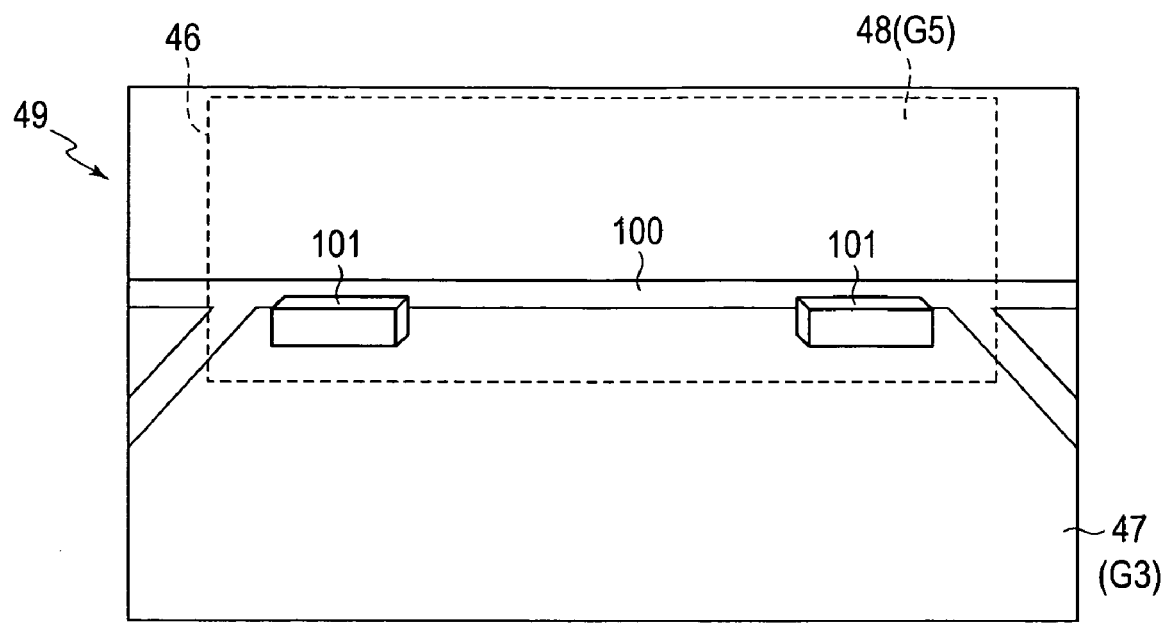
FIG. 19 shows an exemplary composite screen.

When the composition current data G4 is generated, the image drawing processing unit 19 reduces the size of the composition current data G4 by a predetermined reduction rate to generate reduced data G5 (see, e.g., FIG. 19). Then, as shown in FIG. 19, the reduced data G5 is displayed as a composite image in a composition area 46 of the composition past data G3. As a result, a composite screen 49 displaying a past image 47 based on the composition past data G3 and the current image 48 based on the reduced data G5 (current image data G1) may be outputted to the display 7. The past image 47 displays an area currently outside the visible range of the camera 21, e.g., a road surface under the vehicle body floor.

Figure 20:
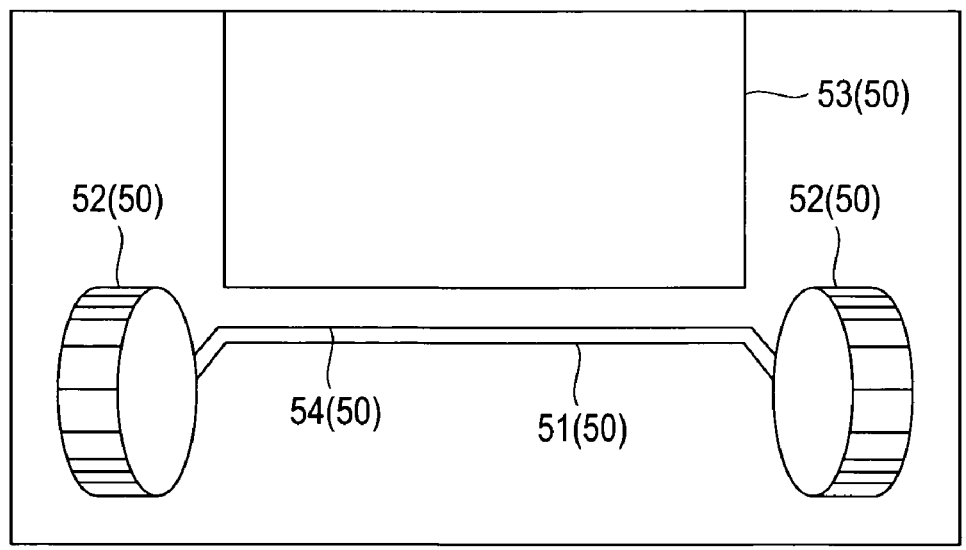
FIG. 20 is a view illustrating auxiliary lines drawn on an exemplary screen.

Further, the image drawing processing unit 19 may display auxiliary lines 50 indicating the position of the vehicle, as shown, for example, in FIG. 20 on the screen of the display 7. The auxiliary lines 50 may include a contour drawing line 54 showing the contour of the vehicle body, a projection line 51 showing projection of the contour drawing line 54 on the ground (road surface), and/or rear wheel drawing lines 52 showing rear wheels. Further, the auxiliary lines 50 may include a partition line 53 between the past image 47 and the current image 48.

The image drawing processing unit 19 may reduce or enlarge the size of the projection line 51, the contour drawing line 54, and/or the rear wheel drawing lines 52 depending on the position of the vehicle. Then, for example, as shown in FIG. 21, the projection line 51, the contour image drawing line 54, and/or the rear wheel drawing lines 52 may be drawn at respective positions in correspondence with the position of the vehicle. The partition line 53 may be drawn at the border between the past image 47 and the current image 48 in the display area 7b of the display 7. The image drawing processing unit 19 may draw the vehicle width extension lines 32 and/or the predicted trajectory lines 33 on the composite screen 49 in an overlapping manner. As a result, the exemplary composite screen 49 shown in FIG. 21 may be displayed on the display 7. In the composite screen 49, the projection line 51, the contour drawing line 54, and/or the predicted trajectory lines 33 may be overlapped on the past image 47. Note that, in FIG. 21, since the steering angle is small, the predicted trajectory lines 33 are overlapped on the vehicle width extension lines 32.

Exemplary parking assist methods will be described with reference to FIGS. 6 to 11. The parking assist methods may be implemented, for example, by one or more components of the above-described parking assist device. For example, they may be carried out under control of the control unit 3 in accordance with the parking assist program stored in the ROM 5. However, even though the exemplary structure of the above-described device may be referenced in the description of the methods, it should be appreciated that the referenced structure is exemplary and the exemplary methods need not be limited by any of the above-described exemplary structure.

Figure 6:
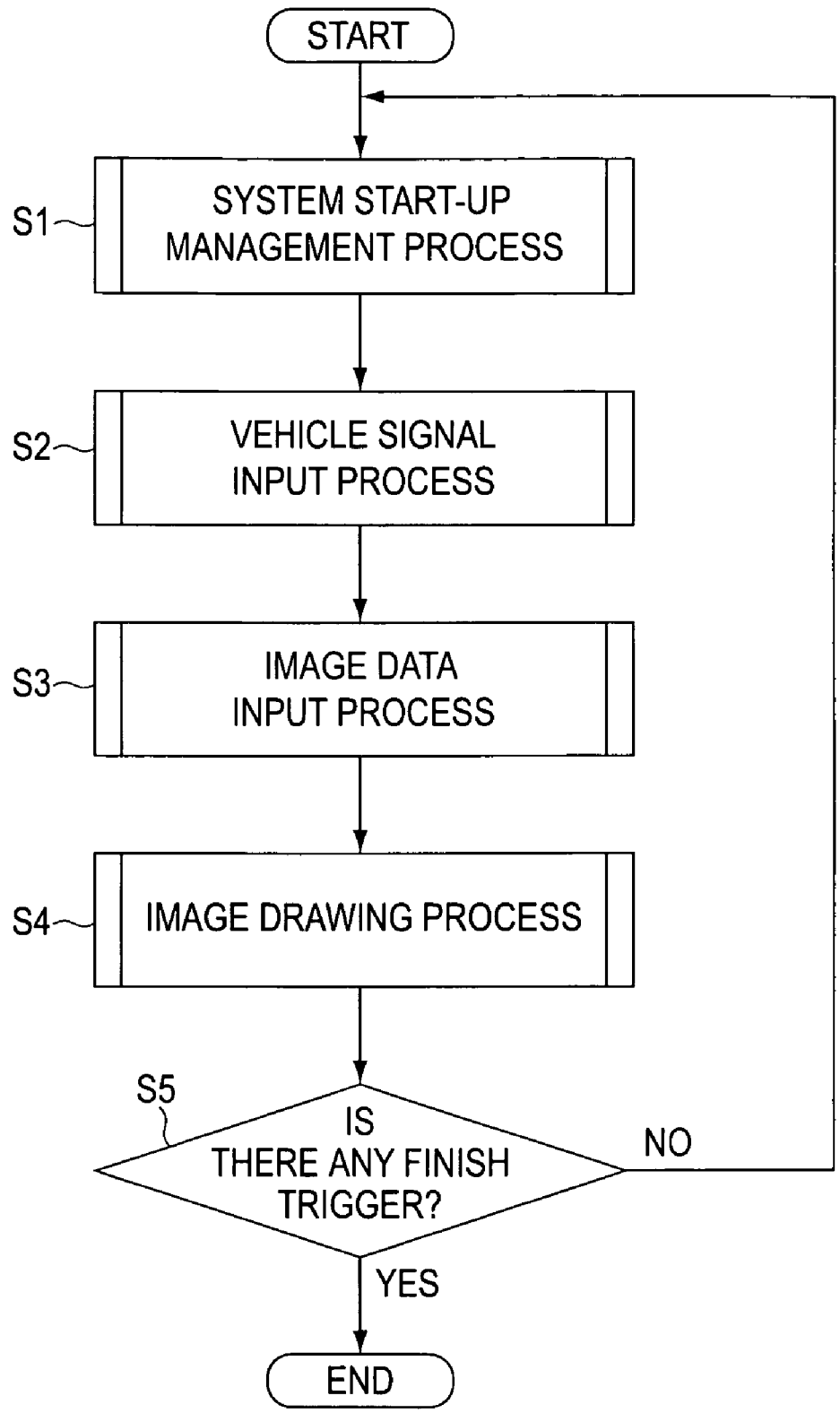
FIG. 6 shows an exemplary parking assist method.

As shown in FIG. 6, the parking assist method may functionally or conceptually includes a system start-up management method or process S1, a vehicle signal input method or process S2, an image data input method or process S3, and/or an image drawing method or process S4. For example, when the control switch 15 is manipulated for inputting data to turn on/off the parking assist function, or when the ignition module is placed in the OFF state, it is determined that there is a finish trigger (YES in S5), and the entire method may be finished. If there is no finish trigger (NO in S6), the processes S1 to S4 are repeated while waiting for the input of the finish trigger.

Figure 7:
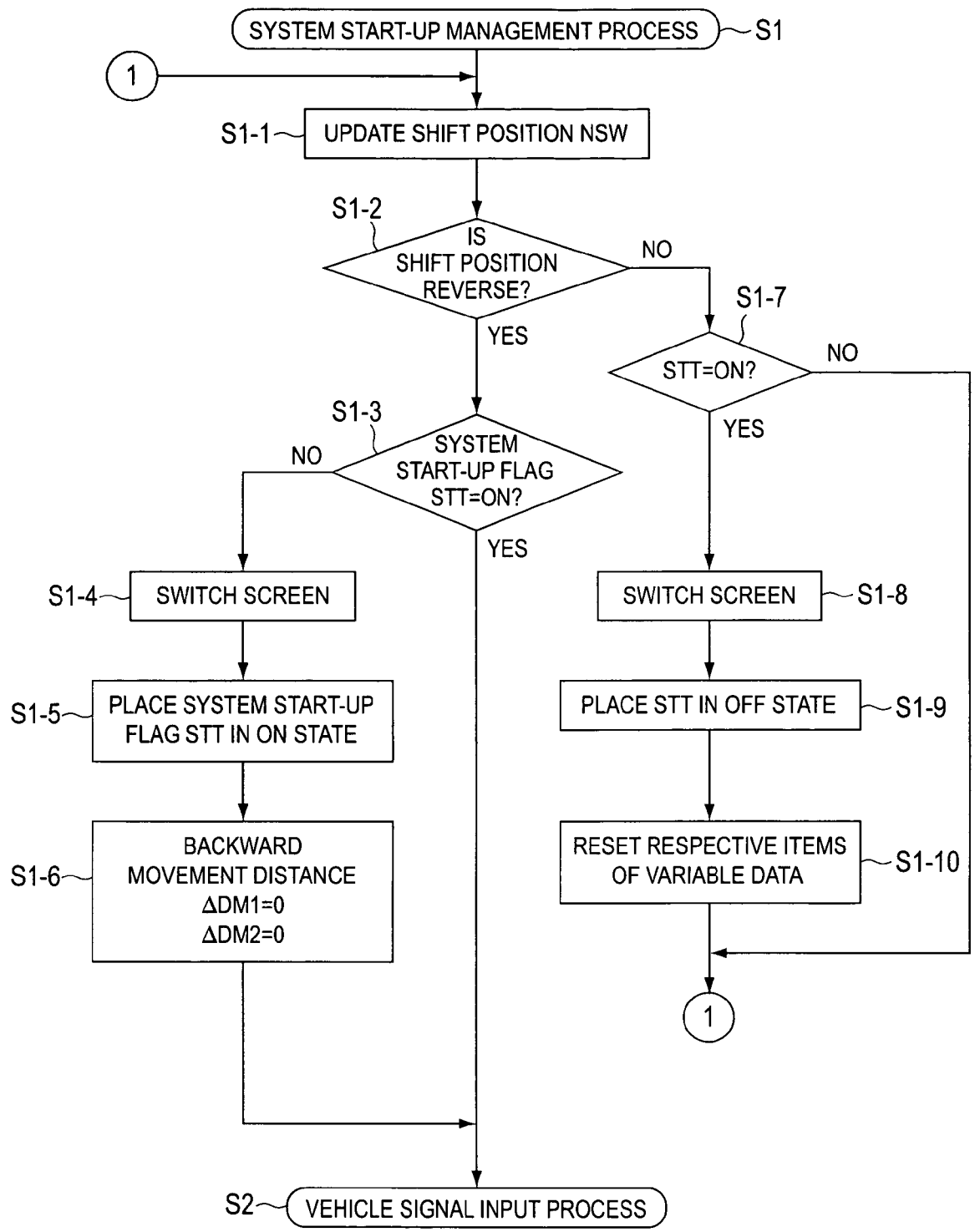
FIG. 7 shows an exemplary start-up method.

An exemplary system start-up management process S1 will be described with reference to FIG. 7. First, the control unit 3 may input a shift position signal SP through the vehicle side I/F unit 9 and may update the shift position NSW stored in the main memory 4 based on the shift position signal SP (step S1-1). Then, the control unit 3 may determine whether the shift position is in the reverse state based on the shift position NSW (step S1-2).

If it is determined that the shift position is in the reverse state (YES in step S1-2), the control unit 3 may then determine whether a system start-up flag STT stored in the main memory 4 is in the ON state (step S1-3). The system start-up flag STT may indicate, for example, whether the parking assist system (parking assist function) for displaying the rear image screen 30 or carrying out accumulation and composition of the image data G has been started up. If, for example, the shift lever is just placed into the reverse position, the system start-up flag STT is in the OFF state.

If it is determined that the system start-up flag STT is in the OFF state, (NO in step S1-3), the control unit 3 may delete the screen displayed on the display 7 and may switch the screen to the rear image screen 30 (step S1-4). Then, the control unit 3 may update the system start-up flag STT by placing it into the ON state (step S1-5).

Then, the control unit 3 may initialize a first backward movement distance ΔDM1 and a second backward movement distance ΔDM2 stored in the main memory 4 to "0" (step S1-6). The first backward movement distance ΔDM1 is a variable for switching to an image composition mode and may indicate the accumulated distance of the backward movement of the vehicle C after the start-up of the parking assist function. The second backward movement distance ΔDM2 is a variable for determining the timing of updating the composite screen 49 and may indicate the backward movement distance from the position where the image data G was previously taken. After the first and second backward movement distances ΔDM1 and ΔDM2 are initialized, the exemplary method proceeds to the vehicle signal input process (S2).

If the system start-up management process is operating for the second time or later, since the system start-up flag STT has been placed in the ON state (YES in step S1-3), the operation would proceed directly to the vehicle signal input process (S2).

Figure 8:
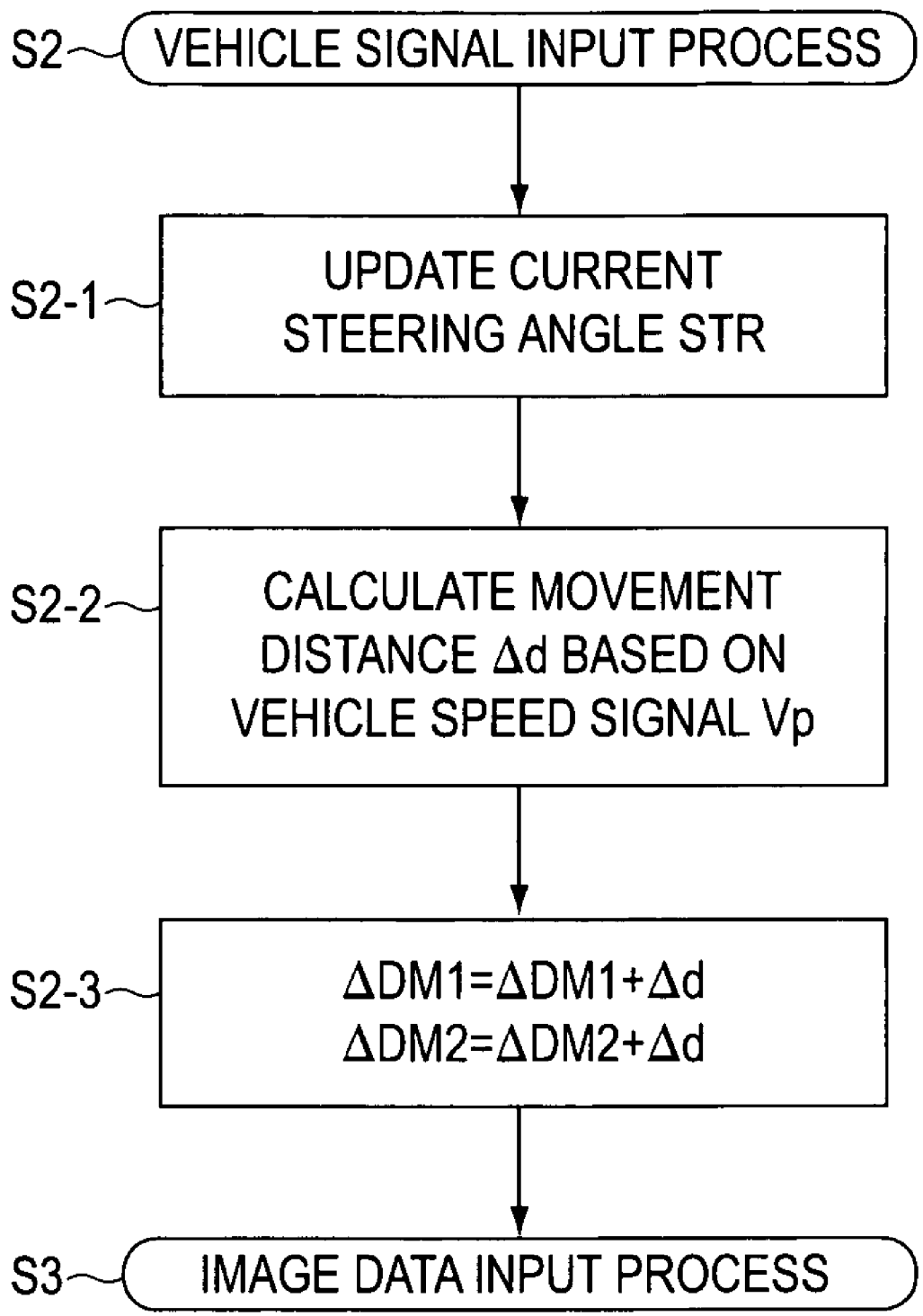
FIG. 8 shows an exemplary vehicle signal input method.

An exemplary vehicle signal input process S2 will be described with reference to FIG. 8. As shown in FIG. 8, the control unit 3 may obtain a steering sensor signal ST through the vehicle side I/F unit 9 and may update the current steering angle STR (step S2-1). The control unit 3 may input a vehicle speed signal Vp through the vehicle side I/F unit 9 and may calculate the movement distance Δd based on the vehicle speed signal Vp (step S2-2). The movement distance Δd may be the movement distance from the time point when the first and second backward movement distances ΔDM1 and ΔDM2 were calculated (e.g., in step S2-2). Thus, after the first and second backward movement distances ΔDM1 and ΔDM2 are initialized to "0," the movement distance Δd from the position of the vehicle at the time of starting up the parking assist system may be calculated.

Then, the control unit 3 may adds the movement distance Δd to the first and second backward movement distances ΔDM1 and ΔDM2 stored in the main memory 4 and may calculate new first and second backward movement distances ΔDM1 and ΔDM2 (step S2-3). Then, operation may proceed to the image data input process S3.

Figure 9:
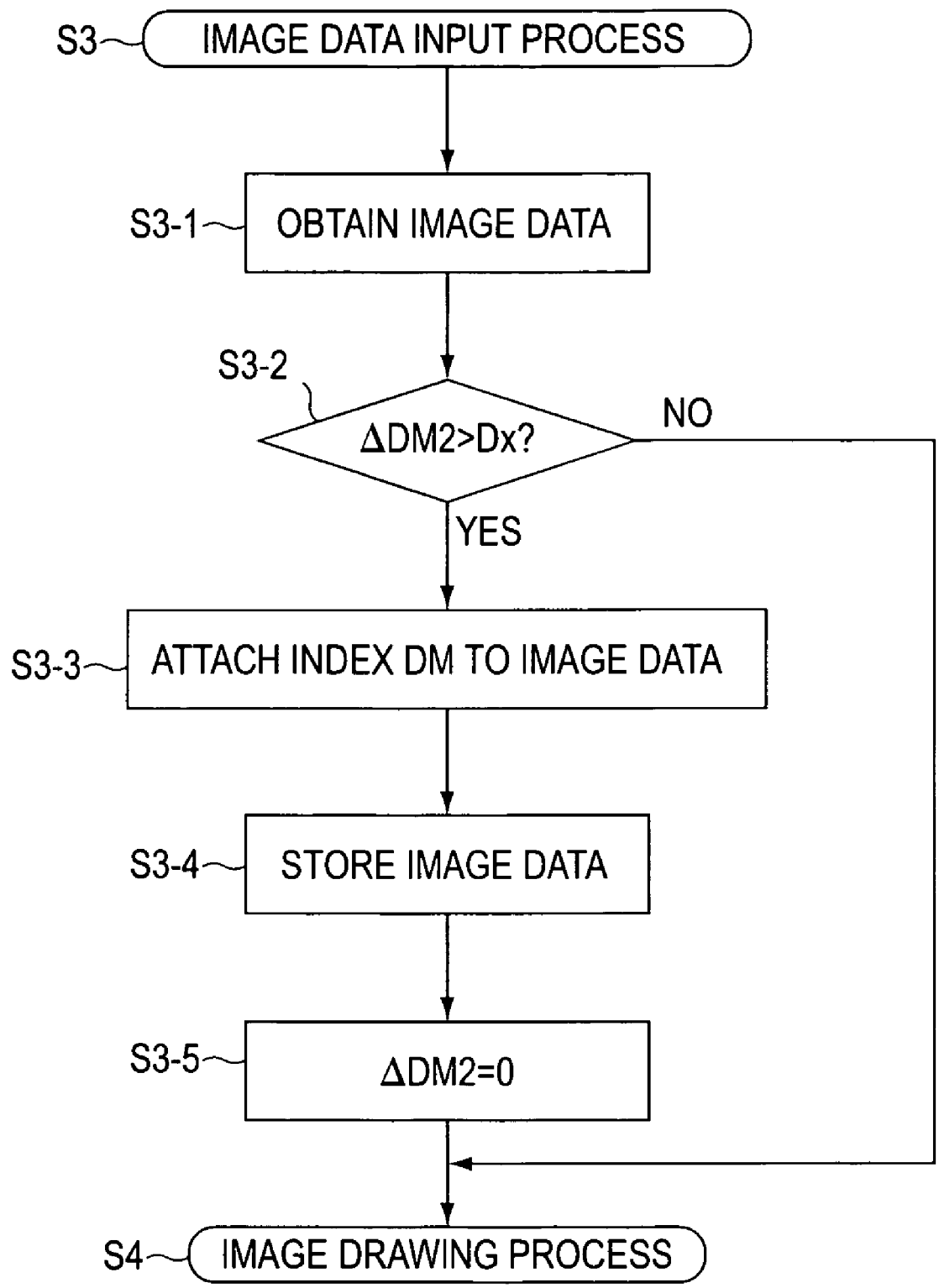
FIG. 9 shows an exemplary image data input method.

An exemplary image data input process S3 will be described with reference to FIG. 9. The control unit 3 may first send a signal reflecting an image obtaining command to the image data obtaining unit 12. As shown in FIG. 9, the image data obtaining unit 12 may then implement drive control of the camera 21 to start imaging and may obtain the image data G from the camera 21 (step S3-1).

Then, the control unit 3 may determine whether the second backward movement distance ΔDM2 is larger than the above-described image updating distance Dx (step S3-2). If it is determined that the second backward movement distance ΔDM2 is the image updating distance Dx or less (No in step S3-2), operation may proceed to the image drawing process S4. If it is determined that the second backward movement distance ΔDM2 is larger than the image updating distance Dx (YES in step S3-2), the position where the image data G was taken may be attached to the image data G as the index DM (step S3-3). As described above, the index DM may be the absolute coordinate, or may be the relative coordinate from the reference position.

Then, the image data G to which the index DM is attached may be stored in the image memory 6 (step S3-4). Thereafter, the control unit 3 may reset the second backward movement distance ΔDM2 to "0" (step S3-5). Operation proceeds to the image drawing process S4.

Figure 10:
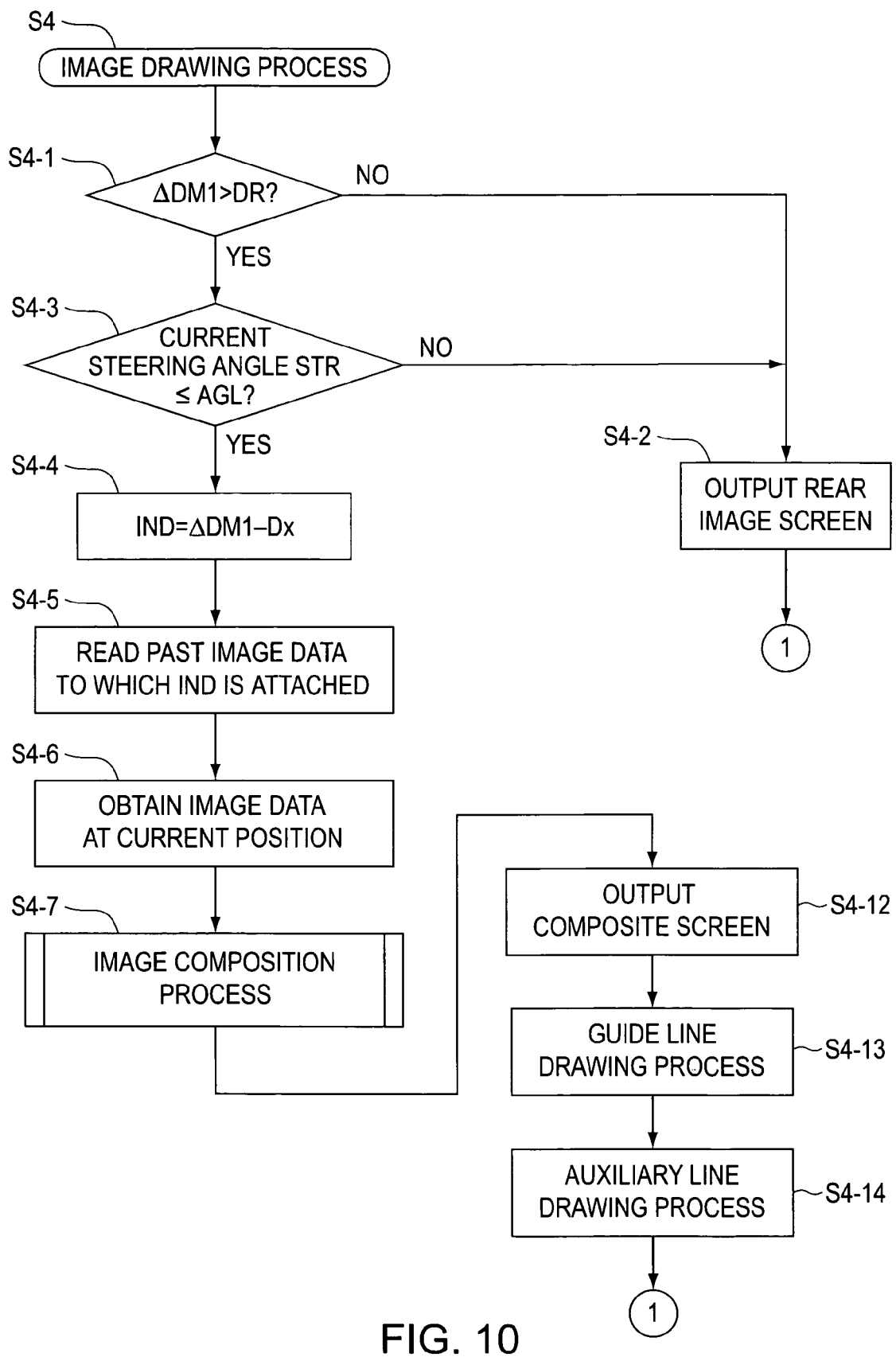
FIG. 10 shows an exemplary image drawing method.

An exemplary image drawing process S4 will be described with reference to FIG. 10. AS shown in FIG. 10, the control unit 3 may determine whether the first backward movement distance ΔDM1 calculated in the vehicle signal input process S2 is larger than the mode switching distance DR for switching the display mode (step S4-1). The mode switching distance DR may be used for switching the display mode from the mode for displaying the rear image screen 30 to the image composition mode for displaying the composite screen 49 using the past image data G2. The mode switching distance DR has a predetermined fixed value. For example, the mode switching distance DR may have a value determined within the range of about 5 m or more, and/or less than about 10 m.

Figure 12:
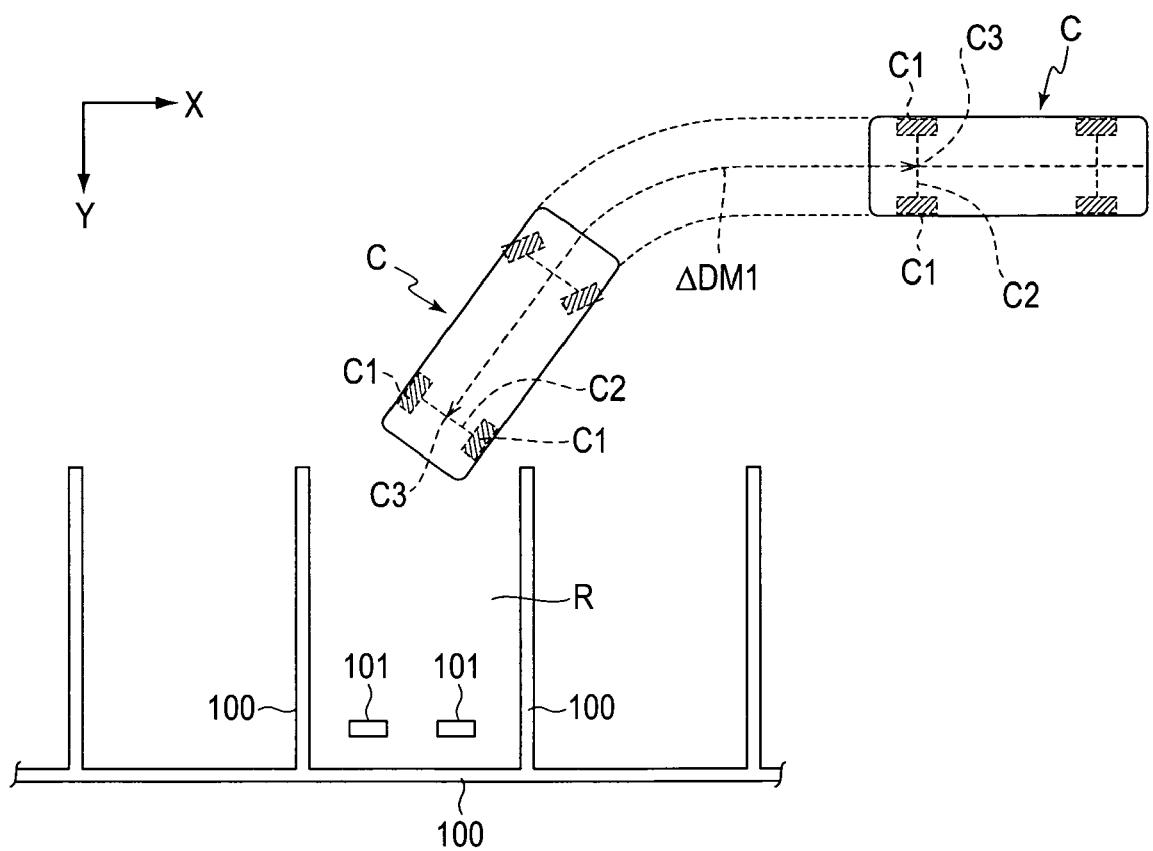
FIG. 12 is a view illustrating a state in which a vehicle is moving backward.

For example, assuming that the position of the vehicle C on the left side in FIG. 12 is the current position, it is determined whether the first backward movement distance ΔDM1 from the backward movement start position shown on the right side in FIG. 12 is larger than the mode switching distance DR. The mode switching distance DR may be determined by estimating the distance from a position where the vehicle C starts the backward movement to a position where the vehicle C enters the parking target area R, and several meters before the rear end of a white line 100 for demarcating the parking target area R or wheel stoppers 101 as three-dimensional obstacles.

If it is determined that the first backward movement distance ΔDM1 is the mode switching distance DR or less (NO in step S4-1), the rear image screen 30 is outputted (step S4-2). At this time, the image drawing processing unit 19 displays the image data G taken at the current position and the guide lines L. After the rear image screen 30 is outputted, operation returns to step S1-1 of the system start-up management process (S1).

If it is determined that the first backward movement distance ΔDM1 is larger than the mode switching distance DR (YES in step S4-1), it may be determined whether the current steering angle STR inputted in the vehicle signal input process S2 is the predetermined steering angle AGL or more (step S4-3). The predetermined steering angle AGL may be a threshold of the steering angle for switching to the image composition mode, and the predetermined steering angle AGL may be set to have a value indicating that the vehicle C has moved to a position near the end of the parking target area R, i.e., a value indicating that the vehicle C has placed in the backward straight movement state ("0" in the present example). For example, at the position of the vehicle C on the left side in FIG. 12, the vehicle C starts to enter the parking target area R. Therefore, the steering angle is larger than the predetermined steering angle AGL. If the control unit 3 determines that the steering angle is larger than the predetermined steering angle AGL (NO in step S4-3), the guide line drawing process is performed (step S4-2).

Figure 13:
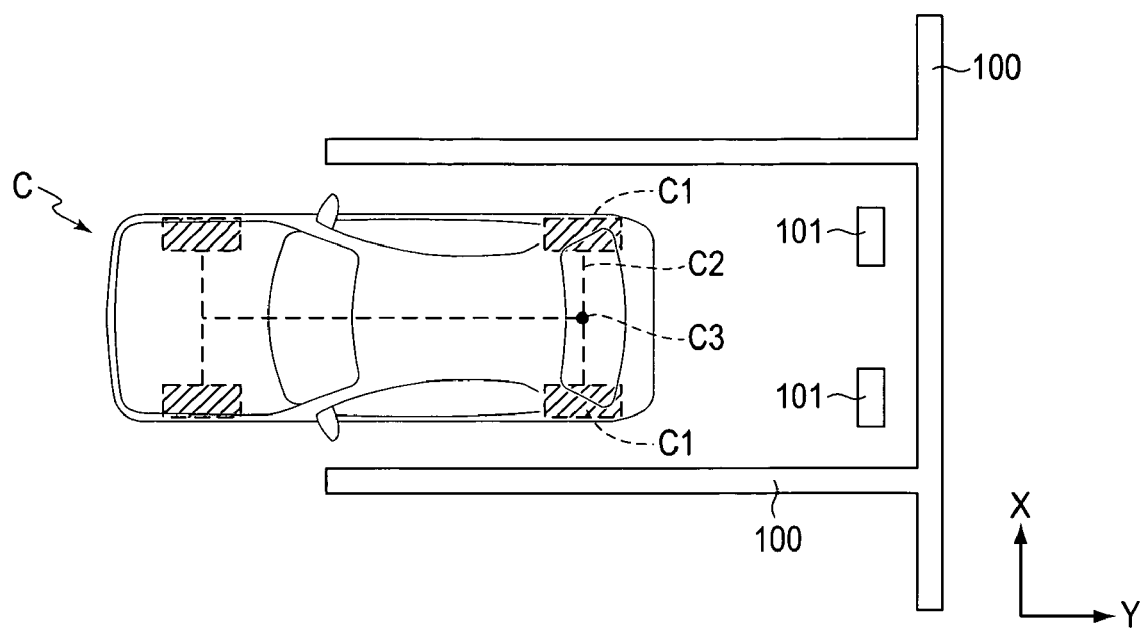
FIG. 13 is a view illustrating a state of backward movement.

For example, as shown in FIG. 13, when the rear wheels C1 of the vehicle C come to positions about 2 m to about 3 m before the wheel stoppers 101, the vehicle body is almost within the parking target area R. Therefore, the steering angle of the vehicle C becomes small. At this time, the control unit 3 determines that the steering angle is the predetermined steering angle AGL or less based on the current steering angle STR (YES in step S4-3) and the vehicle C has moved to a position near the end of the parking target area R. The control unit 3 may determine that the parking operation has gone on to the latter half and may start the image composition mode. That is, the start of the image composition mode may be triggered when it is detected that the first backward movement distance ΔDM1 is larger than the mode switching distance DR and/or it is detected that the current steering angle STR is the predetermined steering angle AGL or less.

Figure 14:
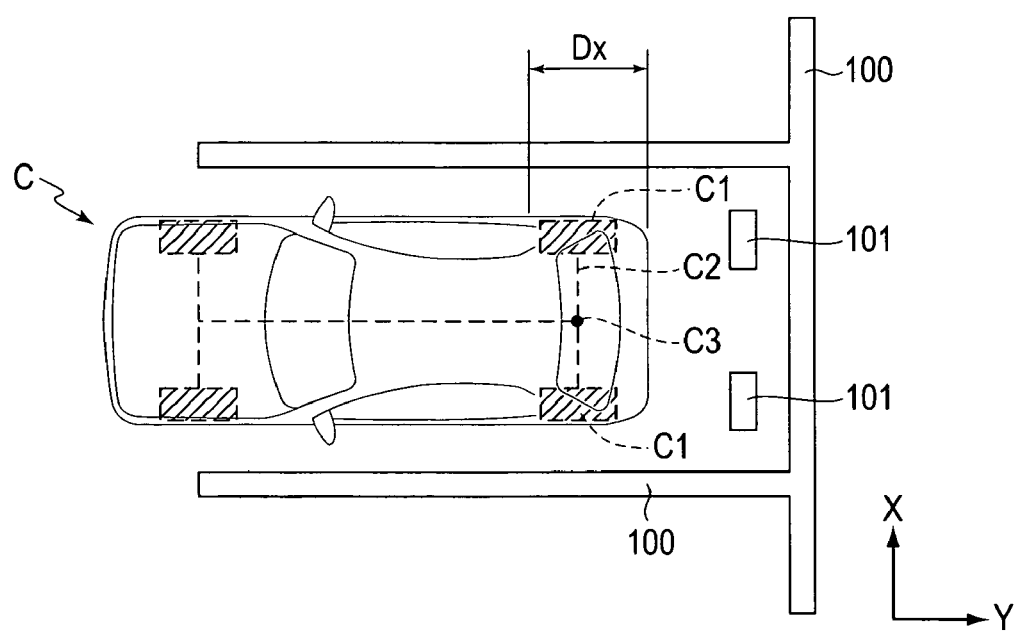
FIG. 14 is a view illustrating a state of backward movement.

Then, the control unit 3 may update a search index IND (step S4-4). The search index IND may be a variable calculated by subtracting the image updating distance Dx from the first backward movement distance ΔDM1 and may be used for searching the past image data G2. The control unit 3 may control the image drawing processing unit 19, and may read the past image data G2 (to which the index DM same as the search index IND is attached) from the respective pieces of past image data G2 stored in the image memory (step S4-5). For example, in step S4-3, assuming that the mode switching point where the current steering angle STR becomes the predetermined steering angle AGL or less is the position of the vehicle C shown in FIG. 14, the past image data G2 taken at the position of the vehicle C in FIG. 13 is read. The position of the vehicle C in FIG. 13 is ahead of the position of the vehicle at the time when the vehicle C is at the position in FIG. 14 by the movement distance Dx (to the back in the backward movement direction, i.e., in the direction opposite to the Y direction in the drawings). For example, the past image data G2 taken at the position of the vehicle C in FIG. 13 is data of the image 40 as shown in FIG. 15.

The control unit 3 may control the image drawing processing unit 19 to obtain the image data G at the current position (current position image data G1)(step S4-6). For example, the current image data G1 obtained at this time is data of the image 44 as shown in FIG. 17.

Next, the control unit 3 may carry out the image composition process using the past image data G2 and the current image data G1 (step S4-7).

Figure 11:
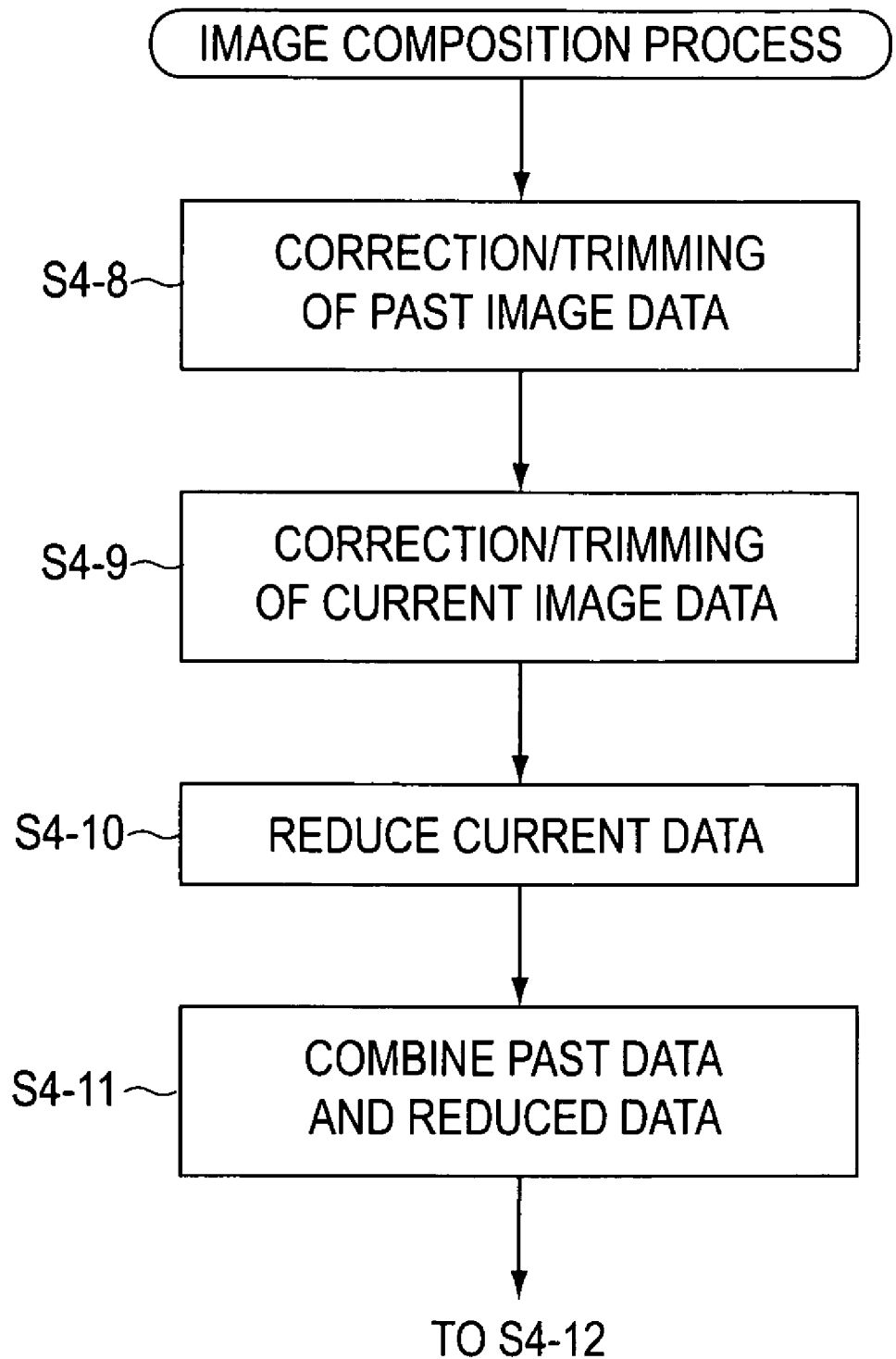
FIG. 11 shows an exemplary an image composition method.

An exemplary image composition process will be described with reference to FIG. 11. As shown in FIG. 11, the control unit 3 may control the image drawing processing unit 19 to correct distortion (e.g., distortion aberration) of the past image data G2, as shown in the image 42 in FIG. 16, and may extract (e.g., trim) an area 43 other than the rear end image 41 from the corrected past image data G2 (step S4-8). Thus, the composition past data G3 is generated.

Further, the image drawing processing unit 19 may corrects distortion aberration of the current image data G1 of the image 44, as shown in FIG. 17, and may generate the current image data G1 for outputting an image 45, as shown in FIG. 18. Then, the image drawing processing unit 19 may extract the area 43 other than the rear end image 41 from the corrected current image data G1 (step S4-9). Thus, the composition current data G4 is generated.

Further, the image drawing processing unit 19 may reduce the size of the composition current data G4 at a predetermined reduction ratio to generate reduced data G5 (step S4-10). Then, as shown in FIG. 19, the reduced data G5 may be displayed as a composite image in the composition area of the composition past data G3 (step S4-11).

After composition, the reduced data G5 and the composition past data G3 may be transmitted to the VRAM of the image drawing processing unit 19 and may be outputted to the display 7 (step S4-12). Then, the image drawing processing unit 19 may carry out the image drawing process for the guide lines L (vehicle width extension lines 32) (step S4-13), and the image drawing process for the auxiliary lines 50, as shown in FIG. 20 (step S4-14). As a result, the composite screen 49, as shown in FIG. 21, may be displayed on the display 7. The driver can thus recognize the relative positions of the rear wheels C1 and the wheel stoppers 101 from the past image 47 and the auxiliary lines 50. Therefore, the parking of the vehicle C straight into the parking target area R is facilitated.

After the composite screen 49 is displayed, operation returns to the step S1-1 of the system start-up management process S1. After the processes S1 to S4 are repeated several times, the vehicle C moves backward to the position where the vehicle C contacts the wheel stoppers 101. At this position, since the wheel stoppers 101 are not within the current visible range of the camera 21, the wheel stoppers 101 are displayed in the past image (not shown). Further, since it is possible to predict the timing when the rear wheels C1 contact the wheel stoppers 101 from the composite screen 49, the driver can perform the driving operation such that the shock at the time the rear wheels approach or contact the wheel stoppers 101 is avoided or small.

After parking is finished, the driver may change the shift lever from the reverse position to the parking position, or set a parking brake. Thus, the control unit 3 may determine that the shift position is not in the reverse state based on the shift position NSW inputted in step S1-1 in FIG. 7 (NO in step S1-2). Further, the control unit 3 may determine whether the system start-up flag STT is in the ON state (step S1-7). At the time when parking is finished, since the system start-up flag STT is placed in the ON state (YES in step S1-7) and the control unit 3 may delete the composite screen 49 and may switch the image composition mode to the mode for displaying a map screen 7a (Step S1-8).

Then, the control unit 3 may place the system start-up flag in the OFF state (step S1-9). The control unit 3 may reset the search index IND, the shift position NSW, and/or the current steering angle STR stored in the main memory 4 to initial values (step S1-10). When the shift position of the vehicle C is not in the reverse state, step S1-1, step S1-2, and step S1-7 may be repeated until the ignition module of the vehicle C is not placed in the OFF state, or the control switch 15 is manipulated to turn off the parking assist function, and the input of the shift position signal SP indicating the finish trigger or the reverse state is awaited.

Then, when the ignition module is placed in the OFF state or the control switch 15 is manipulated to input data for generating the finish trigger (YES in step S5 in FIG. 6), the parking assist method is finished.

As discussed above, the control unit 3 of the navigation apparatus 1 may include or be attached to the image data obtaining unit 12, the image memory 6, and/or the image drawing processing unit 19. The image data obtaining unit 12 may obtain the image data G from the camera 21 mounted on the rear end of the vehicle C. The image memory 6 may associate the image data G with the position of the vehicle and may store it as the past image data G2. Further, the control unit 3 may be configured to detect that the vehicle C has moved to a position near the end of the parking target area R based on the shift position signal SP, the steering sensor signal ST, and/or the vehicle speed signal Vp outputted from the vehicle ECU 20 through the vehicle side I/F unit 9. When the vehicle C comes to a position near the end of the parking target area R, the image drawing processing unit 19 may combine the past image data G2 and the current image data G1, and may output the composite screen 49 on the display 7. Therefore, by minimizing the accumulation and composition of the image data G, it is possible to automatically output the composite screen 49 at the point where the driver desires to confirm the relative positions of the parking target area R and the vehicle body, while reducing a processing load on the apparatus.

As discussed above, if the first backward movement distance ΔDM1 of the vehicle C is larger than the predetermined mode switching distance DR, and the current steering angle STR of the vehicle C is the predetermined steering angle AGL or less, the past image data G2 and the current image data G1 may be combined. Therefore, it is possible to reliably detect that the vehicle C has moved to a position near the end of the parking target area R based on various signals from the vehicle ECU 20, even if the vehicle C is not equipped with a sensor for detecting the white line 100 marking the parking target area R or the wheel stoppers 101 or even if the navigation apparatus 1 is not equipped with an apparatus for processing signals from the sensor.

As discussed above, the control unit 3 may store the image data G in the image memory 6 when the backward movement of the vehicle C is detected based on the shift position signal SP inputted from the vehicle ECU 20. Therefore, the number of pieces of the accumulated image data is reduced, and the load on the apparatus is reduced.

As discussed above, the control unit 3 may control the image drawing processing unit 19. Each time the vehicle C moves the image updating distance Dx in the backward movement direction, the image drawing processing unit 19 may read the past image data G2 taken at a position before the current position by the image updating distance Dx, from the image memory 6. Then, the current image data G1 taken at the current position and the read past image data G2 taken at a position before the current position may be combined. Thus, each time the vehicle C moves by the image updating distance Dx, it is possible to update the composite screen 49 using the relatively new past image data G2.

As discussed above, the control unit 3 may control the image drawing processing unit 19 to correct distortion aberration of the past image data G2, extract the predetermined area 43 to generate the composition past data G3, and/or transform the viewpoint for the composition past data G3.

Further, the image drawing processing unit 19 may correct distortion aberration of the current image data G1 and may extract the predetermined area to generate the composition current data G4. The size of the current data G4 may be reduced at the predetermined reduction rate to generate the reduced data G5. The reduced data G5 may be combined with the composition past data G3 to output the composite screen 49. Thus, continuity is achieved between the past image 49 and the current image 48. Further, the guide lines L may be drawn on the composite image 49 in correspondence with the current position of the vehicle. Therefore, the driver can recognize the relative positions of the vehicle body and the parking target area R.

As discussed above, the parking assist device may be embodied in the form of the navigation apparatus 1. Therefore, the built-in GPS receiver 8, the vehicle side I/F unit 9, and/or the program for calculating the position of the vehicle may be utilized effectively to output the composite screen 49 for parking assistance.

As discussed above, the navigation apparatus 1 may inputs the orientation detection signal GYR from the vehicle ECU 20. Alternatively, the navigation apparatus 1 may be equipped with a gyro sensor for detecting the orientation of the vehicle C.

As discussed above, the control input 3 may input the shift position signal SP and the steering sensor signal ST from the vehicle ECU 20. Alternatively, the shift position signal SP and the steering sensor signal ST may be input from a control circuit of the transmission or a steering sensor of a steering apparatus through the vehicle side I/F unit 9.

As discussed above, distortion of the image by the wide angle lens may be corrected. However, the distortion aberration correction process may be omitted.

As discussed above, the image updating distance Dx may be about 500 mm. However, the image updating distance Dx may any other distance, such as about 100 mm. As discussed above, the mode switching distance DR may be a fixed value determined in the range of about 5 m or more to less than about 10 m. However, the mode switching distance DR may have a fixed value in another range.

The past image data G2 read from the image memory 6 may be subjected to rotational transformation in correspondence with the current steering angle. Specifically, the steering angle at the time when the past image data G2 was taken may be obtained so as to be compared with the current angle for rotational transformation of the past image data G2. In this manner, the desired continuity between the images may be obtained.

The navigation apparatus 1 may detect that the vehicle C has moved to a position near the end of the parking target area R or the wheel stoppers 101 based on a sensor or a detection device as a surrounding detection unit mounted on the vehicle C. For example, the navigation apparatus 1 may analyze the image data G taken by the camera 21 to detect the white line indicated on the road surface. Further, a radar (or the like) for detecting the inside of the parking target area R or a three-dimensional obstacle around the radar may be mounted on the vehicle C so that the navigation apparatus 1 can detect the wheel stoppers 101 or other three-dimensional obstacles. When these detection devices detect that the vehicle C has moved to a position several meters before the wheel stoppers 101 or a position several meters away from the white line at the rear end of the parking target area R, the detection may be regarded as the start trigger to start the image composition mode.

As discussed above, when the control unit 3 detects that the vehicle C has started to move backward, accumulation of the image data G may be carried out. Alternatively, when the control unit 3 detects that the vehicle C has started to move backward and the current steering angle STR becomes the predetermined steering angle (e.g., the predetermined steering angle AGL) or less, accumulation of the image data G may be started. In this manner, the amount of the accumulated image data may be further reduced, and the load on the apparatus may be equally further reduced, for example, during the image data input process and/or the image drawing process. Further, while accumulating the image data G, a level bar indicating the accumulation state of the image data G may be displayed on the screen.

As discussed above, the trigger of starting the image composition-mode may be both of the backward movement of the vehicle C and the state in which the current steering angle STR is the predetermined steering angle AGR or less. Further, the trigger of starting the image composition mode may be a signal indicating that the vehicle C has moved to a position near the end of the parking target area R. For example, the trigger of starting the image composition mode may be one of the backward movement of the vehicle C and the state in which the current steering angle STR is the predetermined steering angle AGR or less. Alternatively, the starting trigger may be the state in which the steering angle remains at the predetermined steering angle for the predetermined time. Alternatively, the starting trigger may be the state in which the vehicle speed becomes the predetermined speed or less or the state in which the vehicle speed has been the predetermined speed or less continuously for predetermined time. Alternatively, the starting trigger may be the state in which braking operation is performed a predetermined number of times or more within predetermined time.

The camera 21 may not be provided at the rear of the vehicle C. For example, the camera 21 may be provided at the front, or on a side of the vehicle C. Further, the parking assist process may be carried out when the vehicle C moves forward into the parking target area R. Also in this case, it is possible to display an area under the vehicle body using the image data G generated by the camera. Thus, it becomes possible to easily view an unnoticeable obstacle at the front of the vehicle C.

The above examples have been described in connection with the case in which parking of the vehicle C is performed when vehicle spaces in the parking lot are arranged in parallel in a lateral direction. Alternatively, the image data G at the current position and the past image data G may be displayed on the display 7 in the case in which vehicle spaces in the parking lot are arranged in, foe example, a longitudinal direction.

As discussed above, the parking assist device may be incorporated into the navigation apparatus 1. Alternatively, the parking assist device may be incorporated into another in-vehicle apparatus or provides as a separate device. In this case, components such as the GPS receiver 8 and the map data memory unit 10 may be omitted.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A parking assist system, comprising:
   a display unit; and
   a controller that:
   identifies a position of a vehicle;
   obtains image data of an area around the vehicle from a camera on the vehicle;
   associates the obtained image data with a position of the vehicle where the image data was obtained;
   stores the obtained image data and the associated position of the vehicle as past image data in a memory;
   determines whether the vehicle is moving backward, wherein the determination of whether the vehicle is moving backwards is based on a determined movement direction of the vehicle;
   calculates a backward movement distance from a backward movement start position;
   determines whether the calculated backward movement distance is larger than a predetermined distance;
   determines a steering angle of the vehicle and whether the steering angle is less than a predetermined angle; and
   displays an image on the display unit when it is determined that a parking operation has gone onto a latter half of the parking operation based on a determination that the vehicle is moving backward, the backward movement distance is larger than the predetermined distance and the steering angle is less than the predetermined angle, the displayed image being based on the past image data and image data taken at a current position of the vehicle.

2. The parking assist system according to claim 1, wherein the controller:
   obtains vehicle speed information; and
   calculates a backward movement distance based on the obtained vehicle speed information.

3. The parking assist system according to claim 1, wherein the controller stores the past image data in the memory when the controller determines that the vehicle is moving backward.

4. The parking assist system according to claim 1, wherein the controller stores the past image data in the memory when the controller determines that the vehicle is moving backward and the steering angle is less than the predetermined steering angle.

5. The parking assist system according to claim 1, wherein, each time the vehicle moves by a predetermined image updating distance, the controller:
   reads the past image data, the read past image data associated with a position located a distance behind the vehicle equal to the image updating distance in the backward movement direction; and
   displays the image on the display unit based on the read past image data and an image taken at the current position of the vehicle.

6. The parking assist system according to claim 1, wherein the controller displays a first area and a second area on the display unit, the second area continuous to the first area, the first area being part of the past image data and for displaying an area that includes at least one of a portion currently under the vehicle and a portion currently on a side of the vehicle, the second area being part of the image data obtained at the current position.

7. A navigation system comprising the parking assist system of claim 1.

8. A parking assist method, comprising:
   identifying a position of a vehicle;
   obtaining image data of an area around the vehicle from a camera on the vehicle;
   associating the obtained image data with a position of the vehicle where the image data was obtained;
   storing the obtained image data and the associated position of the vehicle as past image data in a memory;

determining whether the vehicle is moving backward, wherein the determination of whether the vehicle is moving backward is based on a determined movement direction of the vehicle;

calculating a backward movement distance from a determined backward movement start position;

determining whether the calculated backward movement distance is larger than a predetermined distance;

determining whether a steering angle of the vehicle is less than a predetermined angle based on a determined steering angle of the vehicle; and displaying an image on the display unit when it is determined that a parking operation has gone onto a latter half of the parking operation based on a determination that the vehicle is moving backward, the backward movement distance is larger than the predetermined distance and the steering angle is less than the predetermined angle, the displayed image being based on the past image data and image data taken at a current position of the vehicle.

9. The parking assist method according to claim 8, further comprising:

obtaining vehicle speed information; and calculating a backward movement distance based on the obtained vehicle speed information.

10. The parking assist method according to claim 8, wherein storing the past image data in the memory comprises storing the past image data in the memory when the controller determines that the vehicle is moving backward.

11. The parking assist method according to claim 8, wherein storing the past image data in the memory comprises storing the past image data in the memory when the controller determines that the vehicle is moving backward and the steering angle is less than the predetermined steering angle.

12. The parking assist method according to claim 8, further comprising, each time the vehicle moves by a predetermined image updating distance:

reading the past image data, the read past image data associated with a position located a distance behind the vehicle equal to the image updating distance in the backward movement direction; and displaying the image on the display unit based on the read past image data and an image taken at the current position of the vehicle.

13. The parking assist method according to claim 8, wherein displaying the image on the display unit comprises displaying a first area and a second area on the display unit, the second area continuous to the first area, the first area being part of the past image data and for displaying an area that includes at least one of a portion currently under the vehicle and a portion currently on a side of the vehicle, the second area being part of the image data obtained at the current position.

14. A storage medium storing a set of program instructions executable on a data processing device usable to assist in parking, the instructions comprising:

instruction for identifying a position of a vehicle;

instructions for obtaining image data of an area around the vehicle from a camera on the vehicle;

instructions for associating the obtained image data with a position of the vehicle where the image data was obtained;

instructions for storing the obtained image data and the associated position of the vehicle as past image data in a memory;

instructions for determining whether the vehicle is moving backward, wherein the determination of whether the vehicle is moving backward is based on a determined movement direction of the vehicle;

instructions for calculating a backward movement distance from a determined backward movement start position;

instructions for determining whether the calculated backward movement distance is larger than a predetermined distance;

instructions for determining whether a determined steering angle of the vehicle is less than a predetermined angle; and instructions for displaying an image on the display unit when it is determined that a parking operation has gone onto a latter half of the parking operation based on a determination that the vehicle is moving backward, the backward movement distance is larger than the predetermined distance and the steering angle is less than the predetermined angle, the displayed image being based on the past image data and image data taken at a current position of the vehicle.

* * * * *

UNITED STATES PATENT AND TRADEMARK OFFICE
CERTIFICATE OF CORRECTION

PATENT NO. : 7,643,935 B2  Page 1 of 1
APPLICATION NO. : 11/433421
DATED : January 5, 2010
INVENTOR(S) : Sakakibara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 445 days.

Signed and Sealed this

Sixteenth Day of November, 2010

David J. Kappos
*Director of the United States Patent and Trademark Office*